United States Patent
Anan

(10) Patent No.: US 11,161,348 B2
(45) Date of Patent: Nov. 2, 2021

(54) INK JET RECORDING APPARATUS

(71) Applicant: KYOCERA Document Solutions Inc., Osaka (JP)

(72) Inventor: Naohiro Anan, Osaka (JP)

(73) Assignee: KYOCERA Document Solutions Inc.

( * ) Notice: Subject to any disclaimer, the term of this patent is extended or adjusted under 35 U.S.C. 154(b) by 0 days.

(21) Appl. No.: 16/931,688

(22) Filed: Jul. 17, 2020

(65) Prior Publication Data

US 2021/0023851 A1 Jan. 28, 2021

(30) Foreign Application Priority Data

Jul. 25, 2019 (JP) .............................. JP2019-137031

(51) Int. Cl.
  *B41J 2/175* (2006.01)
  *B41J 2/045* (2006.01)
  *B41J 2/14* (2006.01)

(52) U.S. Cl.
  CPC ....... *B41J 2/17563* (2013.01); *B41J 2/04501* (2013.01); *B41J 2002/14322* (2013.01); *B41J 2002/14403* (2013.01)

(58) Field of Classification Search
  CPC .. B41J 2/17563; B41J 13/0027; B41J 11/008; B41J 11/007; B41J 2/01; B41J 29/38; B41J 29/393; B41J 29/387; B41J 2/04501; B41J 2002/14322; B41J 2002/14403; H02P 6/16
  See application file for complete search history.

(56) References Cited

U.S. PATENT DOCUMENTS

| | | | | |
|---|---|---|---|---|
| 7,959,248 B2 * | 6/2011 | Naoi | .................... | G03G 15/305 347/16 |
| 2005/0219342 A1* | 10/2005 | Kachi | .................... | B41J 2/2054 347/102 |
| 2007/0126837 A1* | 6/2007 | Takahashi | .............. | B41J 11/007 347/104 |
| 2008/0030536 A1* | 2/2008 | Furukawa | .............. | B41J 11/007 347/16 |

FOREIGN PATENT DOCUMENTS

| | | |
|---|---|---|
| JP | 2009-083401 | 4/2009 |
| JP | 2010-234681 | 10/2010 |

* cited by examiner

*Primary Examiner* — Kristal Feggins
(74) *Attorney, Agent, or Firm* — Gerald E. Hespos; Michael J. Porco; Matthew T. Hespos

(57) ABSTRACT

An ink jet recording apparatus is provided with a conveying unit, a drive roller controller and a discharge timing controller. The drive roller controller controls a rotation speed of a drive roller based on pulse signals output by an encoder and corresponding to an angular velocity of a driven roller and an actual outer diameter of the driven roller. The discharge timing controller controls an ink discharge timing based on signals obtained by attenuating multiple frequency components of a target frequency corresponding to a pulse number of the pulse signals output from the encoder during one turn of the driven roller in the pulse signals and an actual outer diameter of the driven roller.

5 Claims, 4 Drawing Sheets

INK JET RECORDING APPARATUS

INCORPORATION BY REFERENCE

This application is based on Japanese Patent Application No. 2019-137031 filed with the Japan Patent Office on Jul. 25, 2019, the contents of which are hereby incorporated by reference.

BACKGROUND

Field of the Invention

The present disclosure relates to an ink jet recording apparatus for recording characters or images on a recording medium.

Related Art

Conventionally, an ink jet recording apparatus including an ink jet head of a line-head type includes a conveying unit including a conveyor belt for conveying a sheet and the ink jet head arranged above the conveying unit. Characters or images are formed on the sheet by discharging an ink at a predetermined timing from the ink jet head while the sheet is conveyed by the conveying unit.

In such a system, if there is a deviation between a sheet conveyance speed and the ink discharge timing, image failures such as an image shift, image elongation and image contraction occur. Thus, a technique is known by which the ink discharge timing is determined according to a rotation frequency of a driven roller supporting the conveyor belt from inside.

For example, a technique for detecting an angular velocity of a rotary shaft of a driven roller by an encoder provided on the rotary shaft and adjusting a speed of a conveyor belt according to this angular velocity is known as a first conventional technique. Further, it is known as a second conventional technique to adjust an ink discharge timing based on an amount of eccentricity of each roller calculated from changes in rotation speeds of a drive roller and a driven roller for a conveyor belt and an angular velocity obtained by correcting an angular velocity detected by an encoder provided on a rotary shaft of the driven roller by a moving average filter.

SUMMARY

An ink jet recording apparatus according to one aspect of the present disclosure is provided with an ink head, a conveying unit and a control unit. The ink head discharges an ink. The conveying unit is arranged to face the ink head and conveys a sheet to allow the ink to be discharged onto the sheet while carrying the sheet. The conveying unit includes a conveyor belt, a drive roller, a driving unit, a driven roller and an encoder. The conveyor belt carries the sheet and turns and moves along a predetermined turning direction. The drive roller drives the conveyor belt in the turning direction by being held in contact with an inner peripheral surface of the conveyor belt. The driving unit generates a rotational drive force for rotating the drive roller. The driven roller rotates, following the conveyor belt, by being held in contact with the inner peripheral surface of the conveyor belt at a position different from the drive roller. The encoder outputs pulse signals corresponding to an angular velocity of the driven roller. The control unit includes a storage, a filter, a drive roller controller and a discharge timing controller. The storage stores outer diameter information on an outer diameter of the driven roller. The filter attenuates frequency components of a target frequency in the pulse signals output from the encoder, using a frequency corresponding to a pulse number of the pulse signals output from the encoder during one turn of the driven roller as the target frequency, and outputs the attenuated pulse signals. The drive roller controller controls a rotation speed of the drive roller by controlling the driving unit based on the pulse signals output from the encoder and the outer diameter information of the driven roller stored in the storage. The discharge timing controller controls a discharge timing of the ink in the ink head based on output signals of the filter and the outer diameter information of the driven roller stored in the storage.

DETAILED DESCRIPTION

Figure 1:
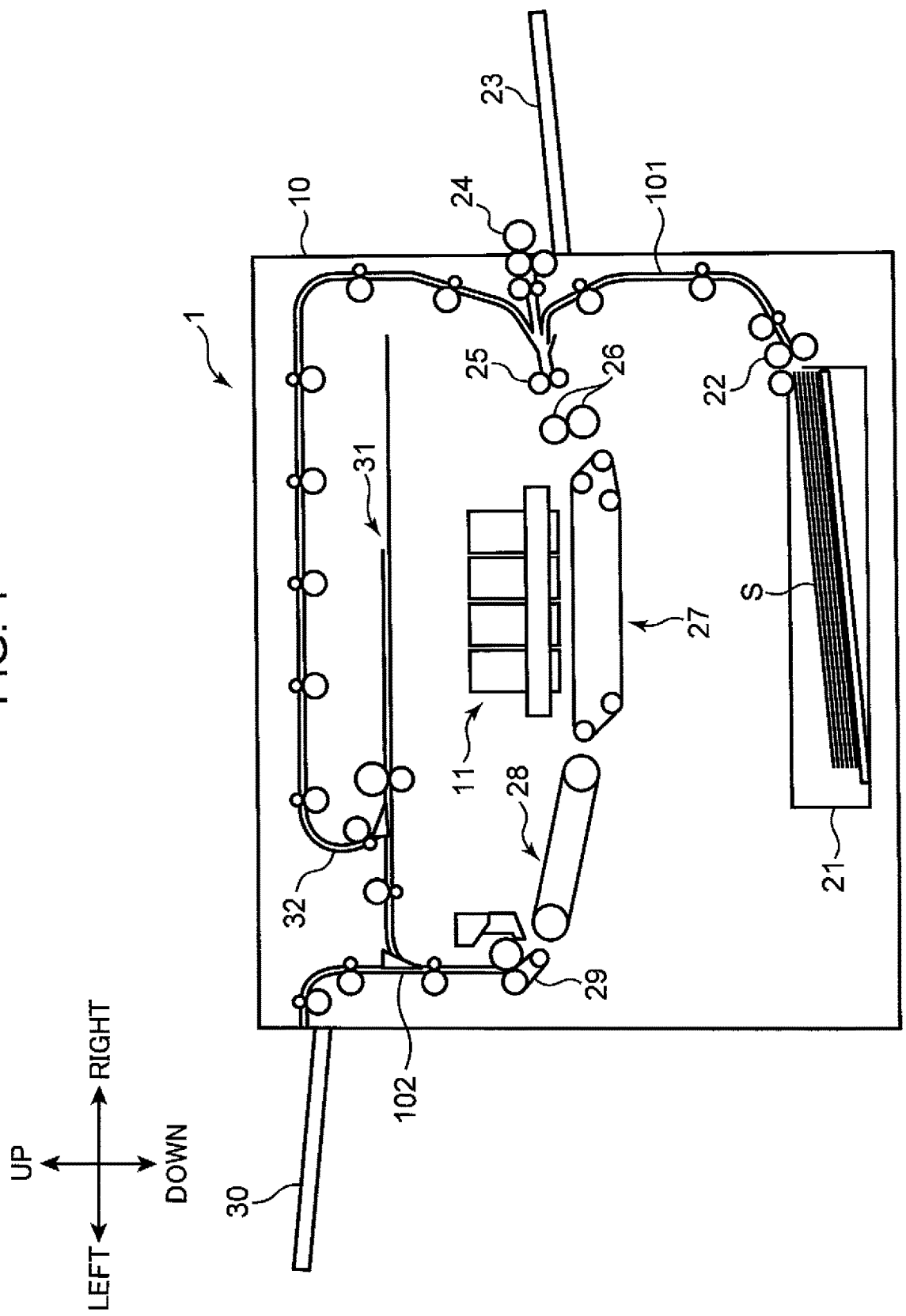
FIG. 1 is a sectional view showing an internal structure of an ink jet recording apparatus according to one embodiment of the present disclosure.

Hereinafter, an embodiment of the present disclosure is described in detail based on the drawings. FIG. 1 is a sectional view showing an internal structure of a printer 1 (ink jet recording apparatus) according to one embodiment of the present disclosure. Note that although the printer is illustrated as an ink jet recording apparatus in this embodiment, the ink jet recording apparatus may be a complex machine, a copier, a facsimile machine or the like.

The printer 1 includes an apparatus body 10 and head units 11, a first sheet conveyance path 101, a second sheet conveyance path 102, a sheet cassette 21, a first sheet feeder 22, a sheet feed tray 23, a second sheet feeder 24, a registration roller pair 25, a conveyor roller pair 26, a first conveying unit 27, a second conveying unit 28, a decurler unit 29, a sheet discharge tray 30, a reversing unit 31 and a double-sided conveyance path 32 respectively arranged in the apparatus body 10.

The apparatus body 10 constitutes the appearance of the printer 1 and houses the respective members and units described above inside. The sheet cassette 21 houses a plurality of sheets S inside. The first sheet conveyance path 101 is a conveyance path arranged in a right-lower part of the apparatus body 10. The first sheet feeder 22 feeds the sheet S housed in the sheet cassette 21 to the first sheet conveyance path 101. As shown in FIG. 1, other conveyor roller pairs are arranged on the first sheet conveyance path 101. The sheet S conveyed along the first sheet conveyance path 101 is carried to the registration roller pair 25.

Similarly, the sheet feed tray 23 is arranged on the right side surface of the apparatus body 10 and sheets S can be placed on an upper surface part of the sheet feed tray 23. The second sheet feeder 24 feeds the sheet S placed on the sheet feed tray 23 toward the registration roller pair 25. The registration roller pair 25 adjusts a skew of the sheet S and adjusts a carry-out timing of the sheet S to the first conveying unit 27. The conveyor roller pair 26 is arranged downstream of the registration roller pair 25 in a conveying direction and conveys the sheet S toward the first conveying unit 27.

The first conveying unit 27 (conveying unit) conveys the sheet S received from the conveyor roller pair 26 to a downstream side in the conveying direction. The first conveying unit 27 is arranged to face the head units 11. The first conveying unit 27 conveys the sheet S to allow the discharge of inks onto the sheet S while carrying the sheet S.

The second conveying unit 28 conveys the sheet S received from the first conveying unit 27 further to the downstream side in the conveying direction. The decurler unit 29 conveys the sheet S further to the downstream side in the conveying direction while correcting a curl of the sheet S received from the second conveying unit 28.

The second sheet conveyance path 102 extends along the left side surface of the apparatus body 10. The sheet S fed by the decurler unit 29 is discharged to the sheet discharge tray 30 via the second sheet conveyance path 102. The reversing unit 31 is a conveyance path branched at an intermediate position of the second sheet conveyance path 102 and is also a part where the sheet S is reversed (switched back) when characters or images are formed on the other side of the sheet S. The sheet S reversed by the reversing unit 31 is carried to the first conveying unit 27 again via the double-sided conveyance path 32, the registration roller pair 25 and the conveyor roller pair 26.

Figure 2:
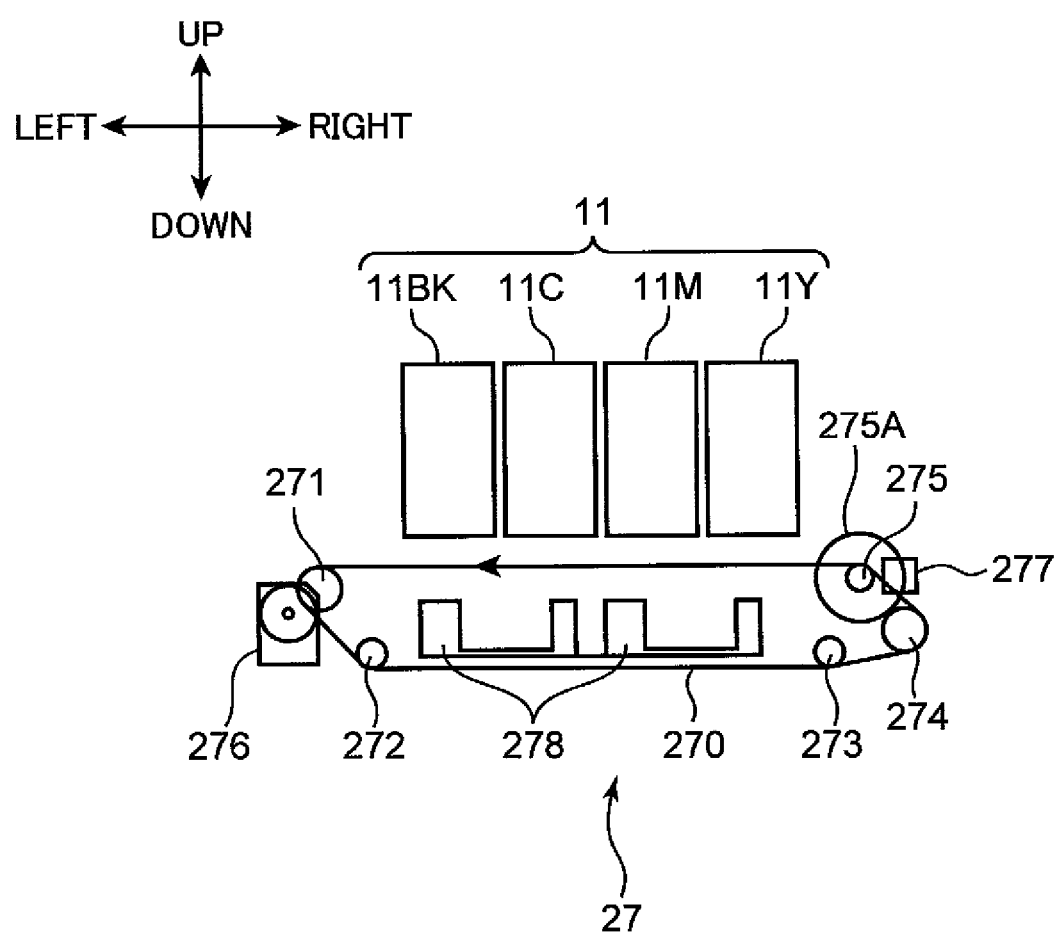
FIG. 2 is a sectional view enlargedly showing the periphery of ink heads and a conveying unit of FIG. 1.

FIG. 2 is a sectional view enlargedly showing the periphery of the head units 11 and the first conveying unit 27 of the printer 1 of FIG. 1.

The head units 11 include a yellow head unit 11Y, a magenta head unit 11M, a cyan head unit 11C and a black head unit 11BK for discharging inks of respective colors. These respective head units are arranged adjacent to each other along the conveying direction of the sheet S. Further, these head units are of a known line head type and include a recording head part extending along a direction (front-rear direction) orthogonal to the conveying direction of the sheet S. A known piezo method, thermal ink jet method or the like is applied as a discharge method for discharging the ink from the recording head.

Further with reference to FIG. 2, the first conveying unit 27 includes a conveyor belt 270, a drive roller 271, a first support roller 272, a second support roller 273, a tension roller 274, a speed detection roller 275 (driven roller), a belt drive motor 276 (driving unit), an encoder 277 and a suction unit 278.

The conveyor belt 270 turns and moves along an arrow direction of FIG. 2 (predetermined turning direction) to convey the sheet S. The drive roller 271 is arranged in contact with the inner peripheral surface of the conveyor belt 270 in a left end part of the conveyor belt 270. The drive roller 271 turns and moves (drives) the conveyor belt 270 in the turning direction by transmitting a moving force to the conveyor belt 270. The first support roller 272 supports the inner peripheral surface of the conveyor belt 270 on a right-lower side of the drive roller 271. The second support roller 273 supports the inner peripheral surface of the conveyor belt 270 on a right side of the first support roller 272. The tension roller 274 supports the inner peripheral surface of the conveyor belt 270 on a right-upper side of the second support roller 273. Note that the tension roller 274 is biased rightward by an unillustrated spring member and has a function of adjusting a tension of the conveyor belt 270.

The speed detection roller 275 supports (is in contact with) the inner peripheral surface of the conveyor belt 270 at a position different from the drive roller 271 on a left-upper side of the tension roller 274. Note that the first support roller 272, the second support roller 273, the tension roller 274 and the speed detection roller 275 respectively rotate, following the conveyor belt 270. Further, the speed detection roller 275 is used to detect a turning speed of the conveyor belt 270. Thus, a pulse plate 275A is fixed to a rotary shaft of the speed detection roller 275. Specifically, the pulse plate 275A is so fixed to the rotary shaft of the speed detection roller 275 that a center thereof coincides with the rotary shaft of the speed detection roller 275. The pulse plate 275A has a disk shape and a plurality of slits (not shown) are formed at equal intervals in a circumferential direction on a side surface thereof.

The belt drive motor 276 (driving unit) generates a rotational drive force for rotating the drive roller 271. The belt drive motor 276 is a known stepping motor and can adjust a rotation speed of the drive roller 271. The belt drive motor 276 is controlled by a motor controller 501 of a control unit 50 to be described later.

The encoder 277 is arranged to face the pulse plate 275A of the speed detection roller 275. The encoder 277 includes a light emitting element for emitting detection light toward the pulse plate 275A and a light receiving element for receiving reflected light of the detection light reflected by the pulse plate 275A (not shown). If the speed detection roller 275 rotates, the pulse plate 275A fixed to the rotary shaft of the speed detection roller 275 also rotates. In accordance with this, the encoder 277 outputs a signal representing that the detection light was reflected by the pulse plate 275A and the light receiving element received the reflected light or a signal representing that the slit of the pulse plate 275A shielded the detection light and the light receiving element did not receive the reflected light. In this way, the encoder 277 outputs pulse signals corresponding to a rotation angle (angular velocity $\omega$) of the pulse plate 275A. Thus, while the speed detection roller 275 is making one turn and the pulse plate 275A is accordingly making one turn, the encoder 277 outputs as many pulse signals as the number of the slits formed in the pulse plate 275A. Hereinafter, a pulse number of pulse signals output from the encoder 277 during one turn of the pulse plate 275A is written as an encoder pulse number.

The suction unit 278 is arranged in an inner peripheral part of the conveyor belt 270 and includes an unillustrated fan. A plurality of unillustrated hole parts are open in the conveyor belt 270. If the fan of the suction unit 278 rotates, air is sucked through the hole parts. As a result, the sheet S is sucked onto the conveyor belt 270.

Figure 3:
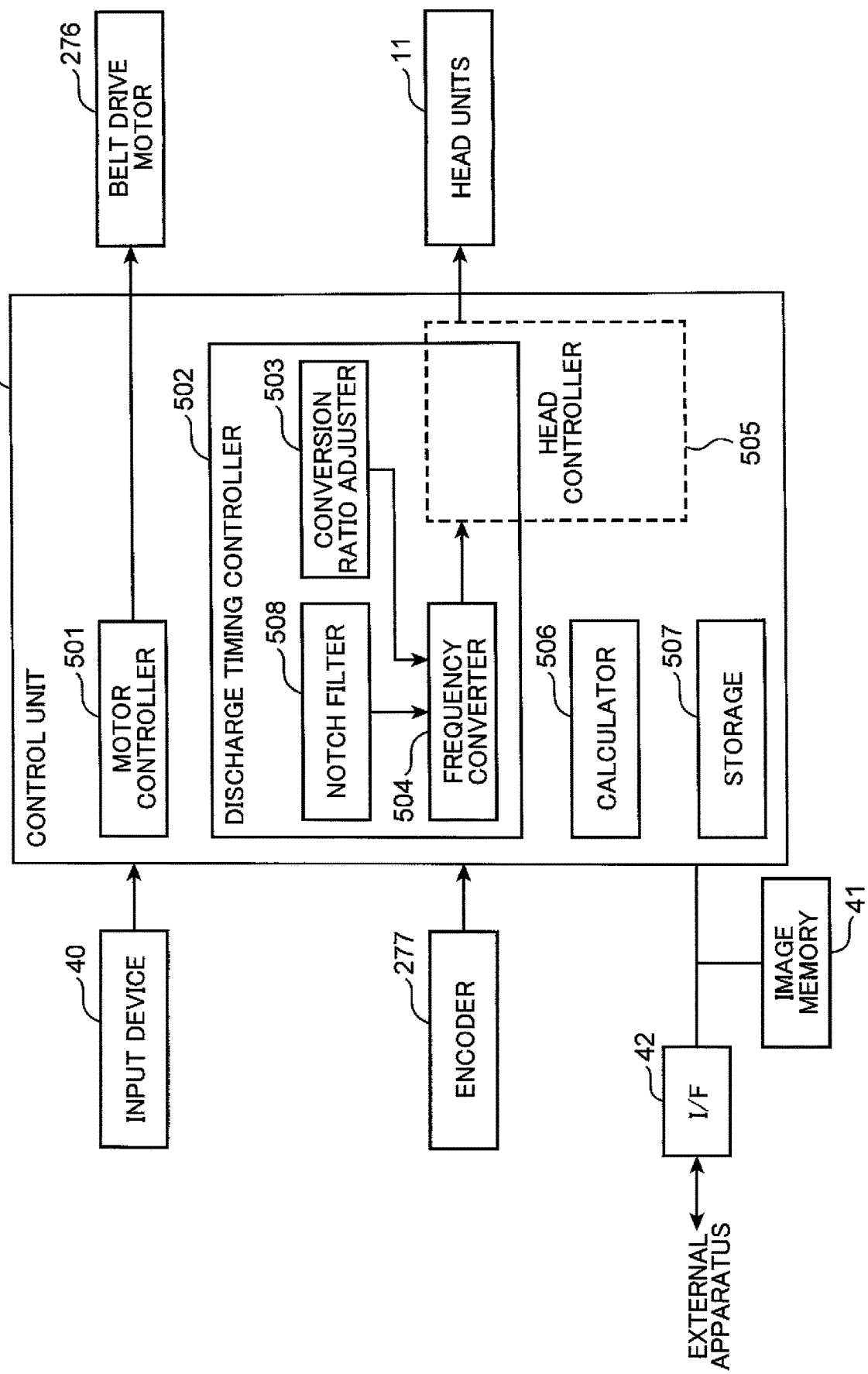
FIG. 3 is a block diagram of a control unit of the ink jet recording apparatus according to the one embodiment of the present disclosure.

The printer 1 further includes the control unit 50. FIG. 3 is a block diagram of the control unit 50 according to this embodiment. The control unit 50 is constituted by a CPU (Central Processing Unit), a ROM (Read Only Memory) storing a control program, a RAM (Random Access Memory) used as a work area of the CPU and the like. Further, an input device 40, an image memory 41, an I/F 42 and the like are electrically connected to the control unit 50 in addition to the aforementioned head units 11, belt drive motor 276 and encoder 277.

The input device 40 is included in an unillustrated operation unit of the printer 1. The input device 40 receives outer diameter information of the speed detection roller 275 input by an operator. Note that the input device 40 may be a shipment inspection jig to be connected to the printer 1 when the printer 1 is manufactured.

The image memory 41 temporarily stores print image data given from an external apparatus such as a personal computer. Note that the image memory 41 temporarily stores image data optically read by an unillustrated reader if the printer 1 functions as a copier.

The I/F 42 is an interface circuit for realizing data communication with an external apparatus. The I/F 42 generates, for example, a communication signal in accordance with a communication protocol of a network connecting the printer 1 and the external apparatus. The I/F 42 converts the communication signal from the network into data of a format processable by the printer 1. A print instruction signal transmitted from a personal computer or the like is given to the control unit 50 via the I/F 42. Further, the image data is stored in the image memory 41 via the I/F 42.

The control unit 50 functions to include the motor controller 501, a discharge timing controller 502, a head controller 505, a calculator 506 and a storage 507 by the CPU executing the control program stored in the ROM.

The motor controller 501 (drive roller controller) controls the operation of each driving member of the printer 1. Particularly, the motor controller 501 controls the rotational drive (on/off, rotation frequency) of the belt drive motor 276. Note that, as described later, the motor controller 501 controls the belt drive motor 276 based on pulse signals output by the encoder 277 and the outer diameter information of the speed detection roller 275 stored in the storage 507. In this way, the motor controller 501 controls the rotation speed of the drive roller 271.

The discharge timing controller 502 controls an ink discharge timing of each head unit 11. Specifically, it is very difficult to mold the speed detection roller 275 such that a cross-section thereof is perfectly circular, and the speed detection roller 275 shakes not a little. Thus, a distance (hereinafter, an actual radius of the speed detection roller 275) from the rotary shaft of the speed detection roller 275 to a contact position of the outer peripheral surface of the speed detection roller 275 and the conveyor belt 270 changes during one turn of the speed detection roller 275. A change similar to this change is repeated every time the speed detection roller 275 makes one turn. Here, it is assumed that the actual radius of the speed detection roller 275 is smaller than a radius in terms of the specifications of the speed detection roller 275. In this case, the speed detection roller 275 moves, following a movement of the conveyor belt 270 over a predetermined distance, and rotates by an angle larger than when the actual radius of the speed detection roller 275 is larger than the radius in terms of the specifications of the speed detection roller 275. Thus, when the speed detection roller 275 shakes, the angular velocity ω of the speed detection roller 275 is detected to be partially larger or smaller than when the speed detection roller 275 does not shake.

Further, it is very difficult to mount the pulse plate 275A such that the center of the pulse plate 275A and the rotary shaft of the speed detection roller 275 accurately coincide. If the center of the pulse plate 275A does not coincide with the rotary shaft of the speed detection roller 275, each of the plurality of slits formed at equal intervals in the circumferential direction in the pulse plate 275A rotates about a position different from the center of the pulse plate 275A. Thus, each slit rotates partially along a larger path or a smaller path than when the center of the pulse plate 275A and the rotary shaft of the speed detection roller 275 coincide. In this way, a timing at which the detection light is shielded by each slit is partially delayed or advanced than when the center of the pulse plate 275A coincides with the rotary shaft of the speed detection roller 275. As a result, the angular velocity ω of the speed detection roller 275 is detected to be partially larger or smaller than when the center of the pulse plate 275A coincides with the rotary shaft of the speed detection roller 275.

Further, there may occur an error in the angular velocity ω of the speed detection roller 275 detected substantially at the same timing by the encoder 277 every time the speed detection roller 275 rotates a plurality of times due to a difference between the number of teeth of a gear (not shown) mounted on the rotary shaft of the speed detection roller 275 and the number of teeth of a drive gear (not shown) for rotating the gear or the like.

Accordingly, when the speed detection roller 275 shakes and when the center of the pulse plate 275A does not coincide with the rotary shaft of the speed detection roller 275, there may be an error in the angular velocity ω of the speed detection roller 275 detected substantially at the same timing by the encoder 277 every time the speed detection roller 275 makes one or more turns. In this case, an error may occur in a relationship of the angular velocity ω detected by the encoder 277 and the turning speed of the conveyor belt 270 and it may not be possible to properly adjust the ink discharge timing. As a result, there is a problem that the image elongation or image contraction described above occurs.

To avoid such a problem, the discharge timing controller 502 attenuates multiple frequency components of a target frequency in the pulse signals output from the encoder 277, using a frequency corresponding to the encoder pulse number as the target frequency. Then, the discharge timing controller 502 controls the ink discharge timings in the head units 11 based on the pulse signals having the multiple frequency components of the target frequency attenuated and the outer diameter information of the speed detection roller 275 stored in the storage 507.

Specifically, the discharge timing controller 502 includes a notch filter 508, a conversion ratio adjuster 503 and a frequency converter 504.

Figure 4:
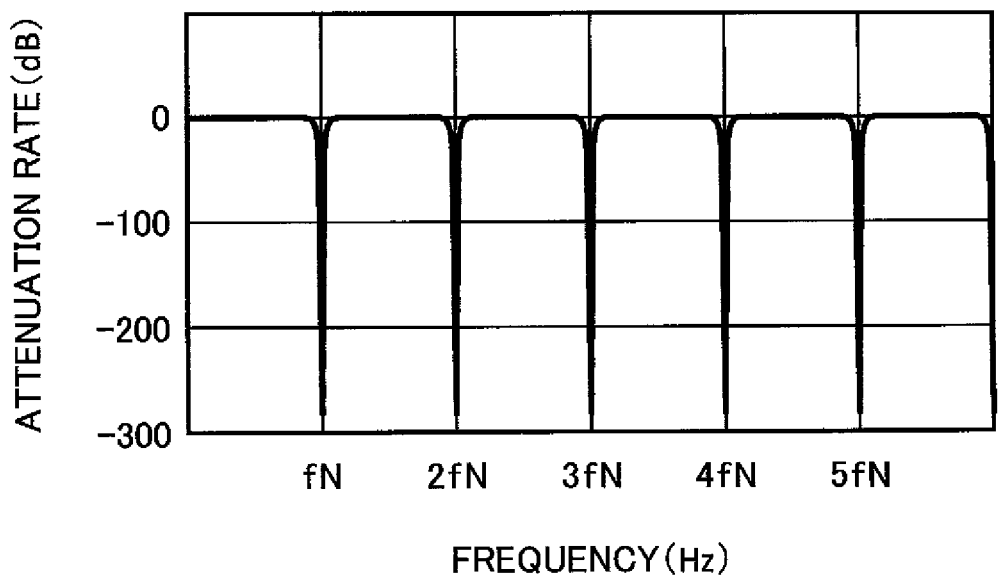
FIG. 4 is a graph showing an example of an attenuation rate when a notch filter attenuates each frequency component in an input signal.

The notch filter 508 is a filter for attenuating predetermined frequency components in an input signal. FIG. 4 is a graph showing an example of an attenuation rate when each frequency component in the input signal is attenuated. In FIG. 4, N denotes the encoder pulse number (pulse number of pulse signals output during one turn of the pulse plate 275A). fN denotes a frequency corresponding to the encoder pulse number N (hereinafter, "target frequency"). Specifically, the target frequency fN is calculated by the following Equation (1).

$$fN \text{ (Hz)} = N/T \qquad (1)$$

Note that, in Equation (1), T denotes a rotation cycle (sec) of the speed detection roller. As shown in FIG. 4, the notch filter 508 attenuates only multiple frequency components fN, 2fN, 3fN, . . . of the target frequency fN in the pulse signals output from the encoder 277 and outputs the attenuated signals to the frequency converter 504 (FIG. 3). Note that, in the following expression, 2fN means twice as high as fN (the same applies also to others). In this way, the notch filter 508 can output the pulse signals, which ignore the error in the angular velocity ω of the speed detection roller 275 occurring every time the speed detection roller 275 makes one or more turns as described above, unlike a moving average filter for averaging and outputting a predetermined number of latest input signals.

Note that the discharge timing controller 502 may include another filter for attenuating only the multiple frequency components fN, 2fN, 3fN, . . . of the target frequency fN in input pulse signals as shown in FIG. 4 and outputting the attenuated signals instead of the notch filter 508.

Alternatively, the discharge timing controller 502 may include a band stop filter for attenuating only frequency components fN±Δf, 2fN±Δf, 3fN±Δf, . . . within a predetermined frequency range ±Δf from each of the multiple frequency components fN, 2fN, 3fN, . . . of the target frequency fN in the input pulse signals and outputting the attenuated signals instead of the notch filter 508.

The conversion ratio adjuster 503 determines a conversion ratio to be input to the frequency converter 504 according to the outer diameter information (individual actual outer diameter) of the speed detection roller 275 input from the input device 40 and stored in the storage 507. If there is no individual difference in the outer diameters of the speed detection roller 275 and the outer diameters of all the speed detection rollers 275 coincide with a center value of design tolerances, the above conversion ratio is 1. Since there are actually individual differences in the outer diameters of the speed detection roller 275, the conversion ratio is set to compensate for (cancel) the individual difference.

The pulse signals output from the notch filter 508 are input to the frequency converter 504. The frequency converter 504 grasps the angular velocity ω of the speed detection roller 275 from the pulse signals input from the notch filter 508. The frequency converter 504 determines a frequency (hereinafter, discharge frequency) of a discharge timing signal for controlling the ink discharge timings in the head units 11 based on the grasped angular velocity ω and the conversion ratio set by the conversion ratio adjuster 503. In this way, not only when there are individual differences in the outer diameters of the speed detection rollers 275, but also when the speed detection roller 275 shakes and when there is a problem in the accuracy of the mount position of the encoder 277, the discharge frequency is properly determined based on the angular velocity ω grasped from the output signals of the notch filter 508 and the conversion ratio set by the conversion ratio adjuster 503.

In this embodiment, assuming that a peripheral speed of the outer peripheral surface of the speed detection roller 257 and the conveying speed (moving speed) of the conveyor belt 270 are equal, the discharge frequency is so set that the ink is discharged from each head unit 11 when the outer peripheral surface of the speed detection roller 275 moves a predetermined distance (e.g. 42 μm). In other words, an inter-dot pitch in a sub-scanning direction (conveying direction) of an ink image to be formed on the sheet S is determined by this frequency.

The head controller 505 is electrically connected to the head units 11 and inputs head control signals to the respective head units 11. The head control signal is set according to the discharge frequency received from the frequency converter 504. Note that the head control signal is set in each of a main scanning direction and the sub-scanning direction according to image information.

The calculator 506 (drive roller controller) performs each calculation in a processing operation to be described later.

The storage 507 stores the outer diameter information on the outer diameter of the speed detection roller 275 input from the input device 40. Further, the storage 507 stores in advance such reference detection information of the encoder 277 that the peripheral speed of the outer peripheral surface of the speed detection roller 275 having a reference outer diameter (e.g. 20 mm) set in advance becomes a predetermined target speed (e.g. 628.3 mm/sec). Here, the reference detection information of the encoder 277 is information representing a pulse number (resolution of the encoder 277, e.g. 1000 ppr) of pulse signals output by the encoder 277 during one turn of the pulse plate 275A.

Similarly, the storage 507 stores in advance reference discharge timing information (e.g. 10 kHz) representing timings at which the head units 11 are caused to discharge the inks every time the outer peripheral surface of the speed detection roller 275 having the reference outer diameter rotates a predetermined distance.

Next, an example of the processing operation of the control unit 50 according to this embodiment is described. As described above, the encoder 277 outputs pulse signals corresponding to the angular velocity ω of the speed detection roller 275. The notch filter 508 outputs pulse signals obtained by attenuating the multiple frequency components fN, 2fN, 3fN, . . . of the target frequency fN in the pulse signals output from the encoder 277.

The calculator 506 grasps the angular velocity ω of the speed detection roller 275 based on the pulse signals output from the encoder 277. The frequency converter 504 grasps the angular velocity ω of the speed detection roller 275 from the pulse signals input from the notch filter 508. That is, the frequency converter 504 ignores an error in the angular velocity ω of the speed detection roller 275 detected substantially at the same timing by the encoder 277 every time the speed detection roller 275 makes one or more turns when the speed detection roller 275 shakes and there is a problem in the accuracy of the mount position of the encoder 277. In this way, the frequency converter 504 can more accurately grasp the angular velocity ω of the speed detection roller 275 than the calculator 506.

A peripheral speed v of the outer peripheral surface of the speed detection roller 275 can be derived from the angular velocity ω grasped by the calculator 506 and the conversion ratio adjuster 503 and an outer diameter D of the speed detection roller 275 (v=D×ω/2). Accordingly, the rotation speed of the drive roller 271 is so controlled that the peripheral speed v of the outer peripheral surface of the speed detection roller 275 becomes the conveying speed of the sheet S (turning speed of the conveyor belt 270) set in advance. On the other hand, there are individual differences in the outer diameters D of the speed detection rollers 275. Thus, the calculator 506 derives a suitable rotation speed of the drive roller 271 according to an actual outer diameter of the speed detection roller 275. The motor controller 501 controls the belt drive motor 276 according to the rotation speed derived by the calculator 506.

Specifically, it is assumed that the reference outer diameter of the speed detection roller 275 is 20.00 (mm), the sheet conveying speed (turning speed) of the conveyor belt 270 satisfying a predetermined printing speed of the printer 1 is 628.3 (mm/sec) and the encoder pulse number N is 1000 (ppr). It is further assumed that the discharge frequency of the head units 11 to satisfy the printing speed is 10000 (Hz) and stored as the above reference discharge timing information in the storage 507 in advance.

In this case, a desired frequency (target frequency fN) of pulse signals to be output from the encoder 277 is stored as the reference detection information of the encoder 277 in the storage 507 in advance. Specifically, the desired frequency (target frequency fN) of the pulse signals to be output from the encoder 277 is derived to be "10000 (Hz)" (={628.3/(20.00×π)}×1000) from the following Equation (2) so that the sheet conveying speed of the conveyor belt 270 becomes 628.3 (mm/sec).

$$fN=\{Vs/(D\times\pi)\}\times N \quad (2)$$

Note that, in Equation (2), Vs denotes the sheet conveying speed (mm/sec), D denotes the outer diameter (mm) of the speed detection roller and N denotes the encoder pulse number. The motor controller 501 normally controls the rotation speed of the drive roller 271 such that the target frequency fN becomes the above desired target frequency fN stored in the storage 507 in advance.

On the other hand, it is assumed that an actual outer diameter of the speed detection roller 275 is 20.05 (mm). In this case, the calculator 506 derives the desired frequency (target frequency fN) of "9975 (Hz)" $(=\{628.3/(20.05\times\pi)\}\times 1000)$ of the pulse signals to be output from the encoder 277 from the above Equation (2) so that the sheet conveying speed of the conveyor belt 270 becomes 628.3 (mm/sec). Then, the calculator 506 adjusts the rotation speed of the drive roller 271 such that the target frequency fN of "10000 (Hz)" derived on the condition that the outer diameter of the speed detection roller 275 is the reference outer diameter becomes the target frequency fN of "9975 (Hz)" derived on the condition that the outer diameter of the speed detection roller 275 is the actual outer diameter.

Specifically, an adjustment ratio (drive adjustment ratio) of the rotation speed of the drive roller 271 when the outer diameter of the speed detection roller 275 is the actual outer diameter (20.05 mm) to the rotation speed of the drive roller 271 when the outer diameter of the speed detection roller 275 is the reference outer diameter (20 mm) is defined by the following Equation (3).

$$Rd = Db/Da \quad (3)$$

Note that, in Equation (3), Rd denotes the drive adjustment ratio, Db denotes the reference outer diameter (mm) of the speed detection roller 275 and Da denotes the actual outer diameter (mm) of the speed detection roller 275. On the other hand, the discharge frequency for determining the ink discharge timings of the head units 11 as described above needs to be "10000 (Hz)" represented by the reference discharge timing stored in advance in the storage 507 so that the sheet conveying speed of the conveyor belt 270 becomes 628.3 (mm/sec) under the same conditions as above.

It is assumed that the frequencies of the pulse signals to be output from the encoder 277 are the above desired target frequency fN of "9975 (Hz)" derived by the calculator 506 when the actual outer diameter of the speed detection roller 275 is 20.05 (mm). In this case, the reference discharge timing information may be corrected by multiplying the discharge frequency represented by the reference discharge timing information when the outer diameter of the speed detection roller 275 is the reference outer diameter by an inverse of the drive adjustment ratio of Equation (3).

Specifically, the conversion ratio adjuster 503 defines an adjustment ratio (discharge adjustment ratio) of the discharge frequency of the head units 11 when the outer diameter of the speed detection roller 275 is the actual outer diameter (20.05 mm) to the discharge frequency of the head units 11 when the outer diameter of the speed detection roller 275 is the reference outer diameter (20 mm) by the following Equation (4).

$$Rc = Da/Db \quad (4)$$

Note that, in Equation (4), Rc denotes the discharge adjustment ratio, Da denotes the actual outer diameter (mm) of the speed detection roller 275 and Db denotes the reference outer diameter (mm) of the speed detection roller 275. However, as described above, there may be an error in the angular velocity ω grasped from the pulse signals output from the encoder 277 when the speed detection roller 275 shakes and when there is a problem in the mount position of the pulse plate 275A. As a result, the frequencies of the pulse signals output from the encoder 277 may not be the above desired target frequency fN of "9975 (Hz)" derived by the calculator 506.

Thus, the frequency controller 504 corrects the discharge adjustment ratio defined by the conversion ratio adjuster 503 as shown in the following Equation (5) based on the frequencies (hereinafter, actual frequencies) of the pulse signals output from the notch filter 508 and the above desired target frequency fN of "9975 (Hz)".

$$Rc = (Da/Db) \times (Fa/fN) \quad (5)$$

Note that, in Equation (5), Rc denotes the discharge adjustment ratio, Da denotes the actual outer diameter (mm) of the speed detection roller 275, Db denotes the reference outer diameter (mm) of the speed detection roller 275 and Fa denotes the actual frequency (Hz). That is, the conversion ratio adjuster 503 inputs the above discharge adjustment ratio as the conversion ratio to the frequency controller 504, and the frequency controller 504 corrects the discharge adjustment ratio input as the conversion ratio based on the pulse signals output from the notch filter 508. In this way, the discharge frequency corresponding to the actual outer diameter of the speed detection roller 275 and the actual rotation speed of the speed detection roller 275 is generated in the frequency controller 504. As a result, a stable ink image is formed on the sheet S in accordance with proper head control signals input to the respective head units 11 from the head controller 505.

As described above, in this embodiment, the drive roller controller constituted by the motor controller 501 and the calculator 506 controls the belt drive motor 276 based on the pulse signals output by the encoder 277 and the outer diameter information (actual outer diameter) of the speed detection roller 275 stored in the storage 507. In this way, this drive roller controller controls the rotation speed of the drive roller 271. Further, the discharge timing controller 502 controls the ink discharge timings in the head units 11 based on the pulse signals output by the notch filter 508 and the outer diameter information of the speed detection roller 275 stored in the storage 507. Thus, not only when the outer diameter of the speed detection roller 275 varies (individual differences), but also when the speed detection roller 275 shakes and when there is a problem in the accuracy of the mount position of the encoder 277, the conveying speed of the sheet S conveyed by the conveyor belt 270 is set at a predetermined target speed. Further, the head units 11 can discharge the inks at proper timings corresponding to the target speed.

Further, in this embodiment, the drive roller controller constituted by the motor controller 501 and the calculator 506 corrects the reference detection information of the encoder 277 based on the outer diameter information (20.05 mm) of the speed detection roller 275. The drive roller controller controls the rotation speed of the drive roller 271 (belt drive motor 276) such that the encoder 277 outputs pulse signals represented by the corrected reference detection information. Thus, the conveying speed of the conveyor belt 270 is properly controlled according to the outer diameter information of the speed detection roller 275 by storing the reference detection information in the storage 507 in advance.

Further, the discharge timing controller 502 constituted by the conversion ratio adjuster 503 and the frequency converter 504 corrects the reference discharge timing information based on the outer diameter information (actual outer diameter) of the speed detection roller 275. The discharge timing controller 502 controls the head units 11 to discharge the inks based on the corrected reference discharge timing information and the pulse signals output from the notch filter 508 after being output from the encoder 277. Thus, both when the speed detection roller 275 shakes and when there is a problem in the accuracy of the mount position of the encoder 277, an error in the angular velocity ω of the speed detection roller 275 detected substantially at the same timing by the encoder 277 every time the speed detection roller 275 makes one or more turns is ignored. Further, the discharge timings of the head units 11 are properly controlled according to the outer diameter information of the speed detection roller 275.

Although the printer 1 according to the one embodiment of the present disclosure has been described above, the present disclosure is not limited to this embodiment and modifications illustrated below can be applied.

(1) In the above embodiment, the outer diameter information of the speed detection roller 275 is input from the input device 40 to the storage 507. It is desirable that the actual outer diameter of each speed detection roller 275 is written as the outer diameter information on a predetermined label and this label is adhered to a unit body of the first conveying unit 27. In this case, an assembly worker of the printer 1 (first conveying unit 27) can store the input actual outer diameter as the outer diameter information in the storage 507 by inputting a value of the actual outer diameter written on the label from the unillustrated operation unit. Note that the label written with the actual outer diameter may be a known barcode label. Further, the outer diameter information may be input to the storage 507 directly from an assembling jig (personal computer) used at the time of manufacturing. Further, the outer diameter information is desirably updated according to a speed detection roller 275 of a new first conveying unit 27 also when it becomes necessary to exchange the first conveying unit 27 after the use of the printer 1 is started.

(2) The position of the speed detection roller 275 is not limited to the position of FIG. 2. Further, the other roller such as the first support roller 272 may be used as the speed detection roller 275.

(3) In the above embodiment, the notch filter 508 attenuates the multiple frequency components fN, 2fN, 3fN, . . . of the target frequency fN in the pulse signals output from the encoder 277. However, the notch filter 508 may be simplified to attenuate only frequency components of the target frequency fN in the pulse signals output from the encoder 277.

Further, the discharge timing controller 502 may include another filter for attenuating only frequency components of the target frequency fN in the pulse signals output from the encoder 277 instead of the notch filter 508 of the modification (3). Alternatively, the discharge timing controller 502 may include a band stop filter for attenuating only frequency components fN±Δf within a predetermined frequency range ±Δf from the frequency components of the target frequency fN in input pulse signals and outputting the attenuated signals instead of the notch filter 508 of the modification (3).

Although the present disclosure has been fully described by way of example with reference to the accompanying drawings, it is to be understood that various changes and modifications will be apparent to those skilled in the art. Therefore, unless otherwise such changes and modifications depart from the scope of the present disclosure hereinafter defined, they should be construed as being included therein.

The invention claimed is:

1. An ink jet recording apparatus, comprising:
an ink head configured to discharge an ink;
a conveying unit arranged to face the ink head, the conveying unit conveying a sheet to allow the ink to be discharged onto the sheet while carrying the sheet; and
a control unit;
wherein:
the conveying unit includes:
  a conveyor belt configured to carry the sheet, the conveyor belt turning and moving along a predetermined turning direction;
  a drive roller configured to drive the conveyor belt in the turning direction by being held in contact with an inner peripheral surface of the conveyor belt;
  a driving unit configured to generate a rotational drive force for rotating the drive roller;
  a driven roller configured to rotate, following the conveyor belt, by being held in contact with the inner peripheral surface of the conveyor belt at a position different from the drive roller; and
  an encoder configured to output pulse signals corresponding to an angular velocity of the driven roller, and
the control unit includes:
  a storage configured to store outer diameter information on an outer diameter of the driven roller;
  a filter configured to attenuate frequency components of a target frequency in the pulse signals output from the encoder, using a frequency corresponding to a pulse number of the pulse signals output from the encoder during one turn of the driven roller as the target frequency, and output the attenuated pulse signals;
  a drive roller controller configured to control a rotation speed of the drive roller by controlling the driving unit based on the pulse signals output from the encoder and the outer diameter information of the driven roller stored in the storage; and
  a discharge timing controller configured to control a discharge timing of the ink in the ink head based on output signals of the filter and the outer diameter information of the driven roller stored in the storage.

2. An ink jet recording apparatus according to claim 1, wherein the filter attenuates multiple frequency components of the target frequency in the pulse signals output from the encoder and outputs the attenuated pulse signals.

3. An ink jet recording apparatus according to claim 1, wherein:
the storage stores in advance such reference detection information of the encoder that a peripheral speed of an outer peripheral surface of the driven roller having a reference outer diameter set in advance becomes a predetermined target speed, and
the drive roller controller corrects the reference detection information based on the outer diameter information and controls the rotation speed of the drive roller such that the encoder outputs pulse signals represented by the corrected reference detection information.

4. An ink jet recording apparatus according to claim 3, wherein:
the storage stores in advance reference discharge timing information representing a timing at which the ink head is caused to discharge the ink every time the outer peripheral surface of the driven roller having the reference outer diameter rotates a predetermined distance, and the discharge timing controller corrects the reference discharge timing information based on the outer diameter information and controls the discharge timing of the ink in the ink head based on the corrected reference discharge timing information and the output signals of the filter.

5. An ink jet recording apparatus according to claim 1, wherein:
the filter is a notch filter.

\* \* \* \* \*